United States Patent
Liao et al.

(10) Patent No.: US 7,668,925 B1
(45) Date of Patent: Feb. 23, 2010

(54) METHOD AND APPARATUS FOR ROUTING IN SAS USING LOGICAL ZONES

(75) Inventors: Heng Liao, Belcarra (CA); Larrie Simon Carr, Anmore (CA)

(73) Assignee: PMC-Sierra, Inc., Santa Clara, CA (US)

( * ) Notice: Subject to any disclaimer, the term of this patent is extended or adjusted under 35 U.S.C. 154(b) by 777 days.

(21) Appl. No.: 11/341,573

(22) Filed: Jan. 30, 2006

Related U.S. Application Data

(60) Provisional application No. 60/647,400, filed on Jan. 28, 2005.

(51) Int. Cl.
*H04L 12/54* (2006.01)
(52) U.S. Cl. .................. 709/212; 370/400; 370/401; 370/428; 370/423; 370/397; 709/230; 709/203
(58) Field of Classification Search .................. 709/212
See application file for complete search history.

(56) References Cited

U.S. PATENT DOCUMENTS

| | | | |
|---|---|---|---|
| 6,622,163 B1 | 9/2003 | Tawill et al. | |
| 6,697,359 B1 | 2/2004 | George | |
| 6,765,919 B1 | 7/2004 | Banks et al. | |
| 6,804,245 B2 * | 10/2004 | Mitchem et al. | 370/395.31 |
| 2009/0073992 A1 * | 3/2009 | Makishima et al. | 370/400 |

* cited by examiner

*Primary Examiner*—Wing F Chan
*Assistant Examiner*—Andrew Woo
(74) *Attorney, Agent, or Firm*—Anne Kinsman; Borden Ladner Gervais LLP

(57) ABSTRACT

A method and apparatus are provided for routing in an SAS expander for logical zoning. Common SAS topology defined by the ANSI T10 specification only relates to physical topology with multiple end devices, as well as to expander devices and the broadcast handling mechanisms in such physical topologies. The present invention introduces the concept of virtual topologies that can be non-overlapping or overlapping subsets of the physical topology and the routing mechanism that handles the routing issues with the virtual topologies.

15 Claims, 8 Drawing Sheets

Expander (102) Routing Database (120)

Direct Routing Database (121)

| Addr | Phy | Zone |
|------|-----|------|
| 101A | 0 | 0 |
| 101A | 1 | 0 |
| 101B | 2 | 1 |
| 101B | 3 | 1 |
| 109 | 4 | 0 |
| 110 | 5 | 1 |
| 103 | 6 | 0 |
| 103 | 7 | 0 |
| 104 | 8 | 1 |
| 104 | 9 | 1 |

Table Routing Database (122)

| Addr | Phy | Zone |
|------|-----|------|
| 111 | 6,7 | 0 |
| 112 | 6,7 | 0 |
| 113 | 6,7 | 0 |
| 114 | 8,9 | 1 |
| 115 | 8,9 | 1 |
| 116 | 8,9 | 1 |

Subtractive Port (123)

| Zone | Phy |
|------|-----|
| 0 | 0,1 |
| 1 | 2,3 |

■ Database entries used by virtual expander (102A)

□ Database entries used by virtual expander (102B)

Figure 2B

| Addr | Phy | Zone |
|---|---|---|
| Server 0-3 | 1 | 1 |
| Server 4-14 | 1 | 2 |
| Server 15 | 1 | 3 |
| Server 16 | 2 | 3 |
| Server 17-30 | 2 | 4 |
| Server 31 | 2 | 1 |
| Storage 0-1 | 3,4 | 5 |
| Storage 2-3 | 3,4 | 6 |
| Storage 4-5 | 3,4 | 7 |

METHOD AND APPARATUS FOR ROUTING IN SAS USING LOGICAL ZONES

CROSS REFERENCE TO RELATED APPLICATIONS

This application claims the benefit of priority of U.S. Provisional Patent Application No. 60/647,400 filed on Jan. 28, 2005, which is incorporated herein by reference.

FIELD OF THE INVENTION

The present invention relates generally to protocols relating to the physical interconnection of storage devices. More particularly, the present invention relates to the Serial Attached SCSI (SAS) protocol and routing.

BACKGROUND OF THE INVENTION

Serial Attached SCSI (SAS) protocol specifies a protocol stack that provides serial physical interconnect that can be used to connect together storage devices such as Hard Disk Drives (HDD) and host devices. It specifies the transport layer protocols to transport SCSI commands, serial ATA commands and management commands among storage devices. The protocol is intended to be used in conjunction with SCSI and ATA command sets.

The SAS protocol defines the function of a SAS expander device, which is part of the service delivery subsystem and facilitates communication between SAS devices. In the general sense, the SAS expanders provide the switching and routing functions among the SAS devices that are attached to it.

Multiple SAS end devices and SAS expander devices can be connected together to form a SAS topology. There can be a single or multiple physical links connecting each pair of neighbouring devices. When there is a single physical link between two devices, the associated Phy on the SAS device is called a narrow port. When there are multiple physical links connecting two devices, the associated phys on an expander are considered to be a wide port. In other words, all links of a wide port are considered to be a common logical link from routing perspective, although it allows multiple simultaneous connections to pass through the wide port at the same time. The SAS standard does not support loop topology, i.e. there can be only one logical path (considering all links of a wide port to be a single link) to traverse the topology from any one device to any other device. Under such constraints, the only type of topology allowed by SAS specification is a tree topology.

SAS protocol defines 3 routing methods for SAS expanders: direct routing, table routing and subtractive routing. The SAS devices exchange an IDENTIFY frame across each physical link as part of link initialization process. Each device sends out its own world-wide-name (unique SAS address) in the IDENTIFY frame to its neighbour in the process. If the device is a SAS expander device, the Expander SMIP address is also used to uniquely identify the expander device. The expander device keeps a record of the SAS address of all neighbouring devices in a table called a direct routing database. The direct routing method is used by the SAS expander device to route connections to all devices directly attached to the expander. In a hierarchical topology, the expanders need to handle connections to devices that are not directly attached to the expander, but are attached to other expanders in the topology that is accessible through one or more expander devices. Such addresses are stored in the expander routing table (or table routing database). When handling a connection OPEN frame, the SAS expanders always use the direct routing method first by searching the destination SAS address in the direct routing database. If a match is found, the expander determines that the destination device is directly attached to itself. Hence the expander routes the OPEN frame to the port that is associated with the destination SAS address according to the direct routing database.

If the direct routing method does not find a match, the expander uses the table routing method by searching the destination address in the table routing database. If a match is found in the table routing database, the expander determines that the address is reachable through a neighbouring expander device. Consequently, the expander routes the OPEN to the port associated with the destination address according to the table routing database. If a match still cannot be found, a subtractive routing method may be used if the expander has one or more phys with subtractive routing attribute. If multiple phys have subtractive routing attribute, these Phys must belong to a wide port. In effect, the subtractive routing attribute defines a default port, to which all unmatched destinations are forwarded. In most cases, the subtractive routing port connects to an upper level expander (or host) that has more complete knowledge of the SAS topology to decide where the final destination device is located.

In the broader field of communications networks, the current state of the art involving routing in logical zones is represented by the following public domain publications: Serial Attached SCSI standard revision 1 and revision 1.1; U.S. Pat. No. 6,804,245 to Mitchem; U.S. Pat. No. 6,765,919 to Banks; U.S. Pat. No. 6,697,359 to George; and U.S. Pat. No. 6,622,163 to Tawill.

A SAS topology can contain a number of host, target and expander devices. The expanders are multi-port devices that provide switch functionality among host, target and expander devices. The SAS standard requires the topology to be without loops within each SAS domain. Furthermore, within a SAS physical domain, there is no mechanism to limit the exchange of information to isolate any device from any other device.

Any topology discovery master can see (discover) all devices within the domain and propagate the route table information to the expanders to allow any devices to connect to any other device. The expanders do not restrict the connection between any devices to any other devices. Broadcast events are propagated to every device in the domain. Expander devices provide unrestricted access to the SMP target, giving unrestricted control of the expander device to any host.

The SAS protocol provides unlimited access to all resources attached to the domain, since it is designed for a trusted environment where traffic isolation and access control in a SAS domain is not needed. However, there are many application environments where traffic isolation and/or controlled access are needed to protect against unauthorized access or interference between unintended devices in a physical domain.

It is, therefore, desirable to provide a routing approach that provides the ability to segment a physical SAS domain into virtual domains to allow access control.

SUMMARY OF THE INVENTION

It is an object of the present invention to obviate or mitigate at least one disadvantage of previous routing approaches.

In a first aspect of the present invention, there is provided a method of handling connection requests in a serially attached SCSI (SAS) expander. The method comprises the steps of receiving a connection request from a source node connected to the expander, the request addressed to a destination node; determining a virtual domain associated with the source node; determining, in accordance with the determined virtual domain, that the destination node is inaccessible; and transmitting a connection rejection to the source node.

In embodiments of the first aspect of the present invention, the connection request is received over a first SAS phy. In other embodiments, the step of determining a virtual domain includes examining the connection request to determine a zone identifier uniquely associated with the virtual domain and may include assigning a zone identifier to the connection request when the zone identifier is not present in the connection request, which can be performed by selecting a zone identifier in accordance with a SAS phy over which the connection request is received. In other embodiments, the step of determining that the destination node is inaccessible includes determining that the destination node is part of a virtual domain inaccessible to nodes in the virtual domain associated with the source node. Further embodiments include determining an egress port associated with the destination node; and determining that the egress port associated with the destination node is inaccessible for nodes in the virtual domain associated with the source node, to determine that the destination node in inaccessible, and may examine an access policy matrix to determine whether the egress port is inaccessible. In a further embodiment, the virtual domain is a logical zone, and wherein the step of determining that the destination node is inaccessible includes determining that the destination node is not part of the logical zone associated with the source node.

In a second aspect of the present invention there is provided a Serially Attached SCSI (SAS) expander for implementing virtual domains. The expander comprises a first and second plurality of logical connections and a first and second logical expander. Each of the logical connections in the first and second pluralities of logical connections is for connecting the expander to an SAS device. The first logical expander receives messages over the first plurality of logical connections, and routes the received messages to a SAS device connected to one of the first plurality of logical connections. The second logical expander receives messages over the second plurality of logical connections, and routes the received messages to an SAS device connected to one of the second plurality of logical connections.

In embodiments of the second aspect of the present invention, the first and second plurality of logical connections are overlapping sets, while in other embodiments, first and second plurality of logical connections are non-overlapping sets. In further embodiments, the first logical expander is responsive only to messages received from devices connected to the first plurality of logical connections. Each logical connection in the first and second plurality of logical connections corresponds to at least one phy in embodiments of the present invention. In other embodiments, first expander includes a routing database for performing direct routing, table routing and subtractive routing, the routing database may only include routing information for devices connected to the first plurality of logical connections. In another embodiment, the routing database includes routing information for devices indirectly connected to the expander through one of the first plurality of logical connections.

In a third aspect of the present invention, there is provided a Serially Attached SCSI (SAS) expander for providing virtual domains. The expander comprises a first plurality of phys, a routing database and a routing engine. Each phy in the plurality of phys connects the expander to an SAS device. The routing database maps a device address to at least one of the plurality of phys, and stores an access control policy. The routing engine receives connection requests from devices connected to the expander by the phys. The connection requests are addressed to a destination device and are routed to a device connected to a phy selected from the plurality of phys in accordance with a mapping obtained from the routing database and in accordance with the access control policy.

In embodiments, the routing engine includes a connection rejection engine for transmitting a connection rejection message to the source of a received connection request when the phy associated with the destination device is specified as inaccessible to the source of the request in the access control policy. In another embodiment, the routing engine includes means to determine a group associated with the source of the connection request by examining a header field of the connection request, and means to assign a group to a connection request upon failure of the means to determine a group to identify a group by inspecting the header field, the means to assign also modify the header field of the connection request to identify a group determined in accordance with the one of the plurality of phys that the connection request was received over. The routing engine can also include means for removing group association from a connection request when the destination phy connects the expander to an external expander that does not recognize virtual domains. The routing database can include an access control matrix for storing for the access control policy. The access control policy can specify at least one group that a connection request can be directed to in accordance with a group associated with the source of the connection request.

The present invention relates to the concept of zoning using logical expanders, and in particular using device group access control. In a multi-zone environment, a physical expander is now divided into several overlapping or non-overlapping logical expanders. Therefore, every expander physical PHY belongs to one or more logical zones. By assigning a PHY to a particular zone it shows up as part of the logical expander for that zone.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2B illustrates an exemplary expander routing database for an expander illustrated in FIG. 2A;

DETAILED DESCRIPTION

Figure 1A:
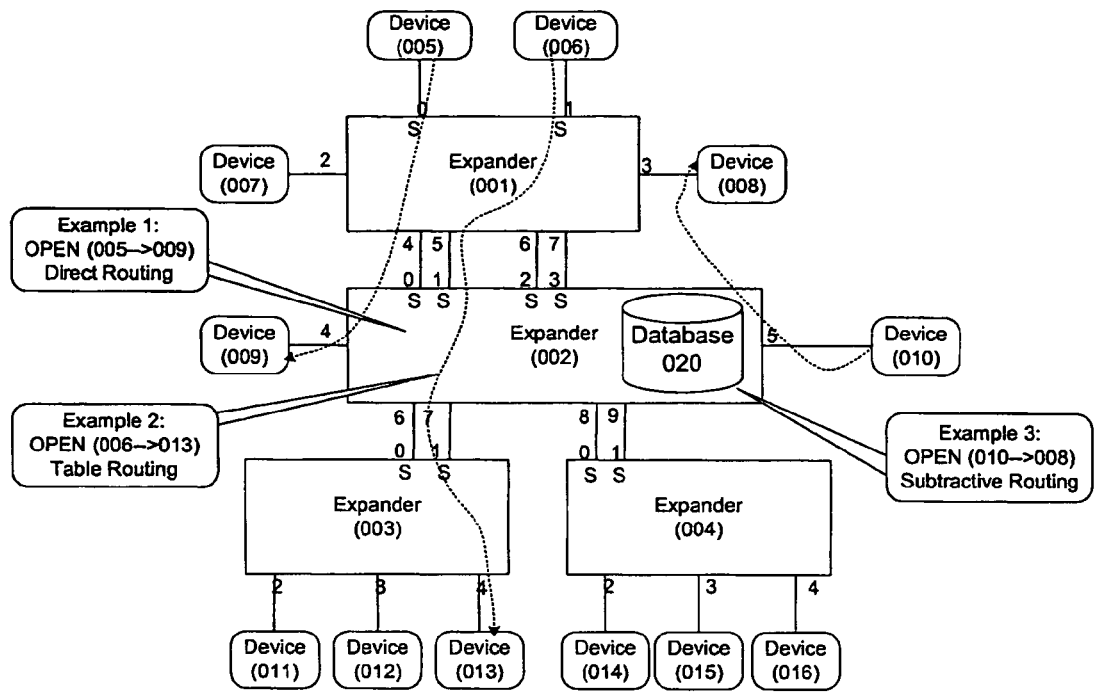
FIG. 1A illustrates known SAS routing methods.

Generally, the present invention provides a method and apparatus for routing in an SAS expander for logical zoning. Common SAS topology defined by the ANSI T10 specification only relates to physical topology with multiple end devices, as well as to expander devices and the broadcast handling mechanisms in such physical topologies. The present invention introduces the concept of virtual topologies that can be non-overlapping or overlapping subsets of the physical topology and the routing mechanism that handles the routing issues with the virtual topologies.

Embodiments of the present invention address the broadcast filtering issue in SAS topology and SAS Expander devices. However, the same concept can be applied to handle port/Phy based broadcast filtering in other types of non-SAS communications networks. An important difference in such alternative embodiments involves the fact that the type of broadcast object handled would no longer be broadcast primitives, but other types of broadcast packets, frames or signals.

Some applications require partitioning of SAS physical topology into logical regions for traffic isolation. The logical regions are defined to limit any traffic across the boundaries of the regions. In other words, any devices assigned to one logical region can access all devices within that logical region, and only the devices within that logical region. In this document, such regions are referred to as "logical zones" or "virtual topologies". These terminologies are used without distinction to refer to the same meaning. It should be noted that some applications demand each logical zone to be fully isolated from other logical zones (non-overlapping); other applications require logical zones to overlap providing the capability to share certain types of target device.

Yet there are other applications that require even more sophisticated access control among groups of end devices. In such an application, the end devices are divided into "Device groups" with common access control permissions. It is required that the SAS expander devices implement access control policies to limit the traffic among the device groups accordingly. Such an access control function is described in this document as "device group access control" mechanism that is similar but yet separate from "logical zones".

Because the concepts used to describe both the logical zones and the groups are very similar it may be useful to consider them as instances of a concept of virtual domains. A SAS device has access control rights to devices in the SAS physical topology defined by the virtual domain to which it belongs. When the virtual domain is instantiated as a logical zone, devices have access to devices that are the same domain, but do not have access to devices outside the domain. This instantiation provides can reduce routing traffic in branches of the SAS tree topology that are excluded from a logical zone. When the virtual domain is instantiated as a series of groups, the access rights of a group are defined, preferably by an access control function or matrix. Elements of a group do not necessarily have access to other elements in their group. Although this does not necessarily provide traffic reduction, it does allow for more granular access control function. One skilled in the art will appreciate that it is possible for a single device to belong to two or more domains.

There are a number of technical aspects of logical zoning including: 1) Broadcast handling in BPP; 2) ECM routing/ connection management, address lookup; 3) SMP target response, including SMP topology discovery slave and PHY reporting and controlling commands; 4) Link layer initialization sequence, including exchange of IDENTIFY frames; 5) Termination of connection by Expander internal virtual targets (including STP Bridge); and 6) Topology discovery of self-configuring expanders. Embodiments of the present invention address the routing aspects of logical zoning.

Other approaches are provided to address the other areas of logical zoning listed above. Some such approaches are provided in United States Provisional Patent Application Ser. No. 60/643,143 filed on Jan. 12, 2005 entitled "Method And Apparatus For Implementing STP Flow Control In SAS Expanders", as well as in U.S. Provisional Patent Application Ser. No. 60/647,400 filed on Jan. 28, 2005 and entitled "Method And Apparatus For Broadcast Primitive Processor (BPP) In SAS Using Logical Zones", each of which is incorporated herein by reference.

Embodiments of the present invention provide SAS logical zoning, and enhancements to SAS routing methods to support logical zones in SAS expanders. The logical zoning concept is introduced by this invention to divide the physical topology into "logical zones". The logical zones can be non-overlapping (to achieve complete isolation across zones), or overlapping (to allow the devices in the overlapped area to be shared across multiple zones). Embodiments of the present invention provide routing methods in SAS logical zones, including: the concept and definition of logical zones, the assignment of membership, and how to handle routing issues in SAS expander devices.

A typical example of a known SAS topology is shown in FIG. 1A. In this example, the topology contains 4 expanders (001, 002, 003, 004) and 12 end devices (005-016). For illustration purpose, assume the SAS address of each device in this topology to have the value of the label in FIG. 1A. For instance, the SAS address of device (012) has the value of 012. The phy identifiers are labelled on each link of the expanders.

Figure 1B:
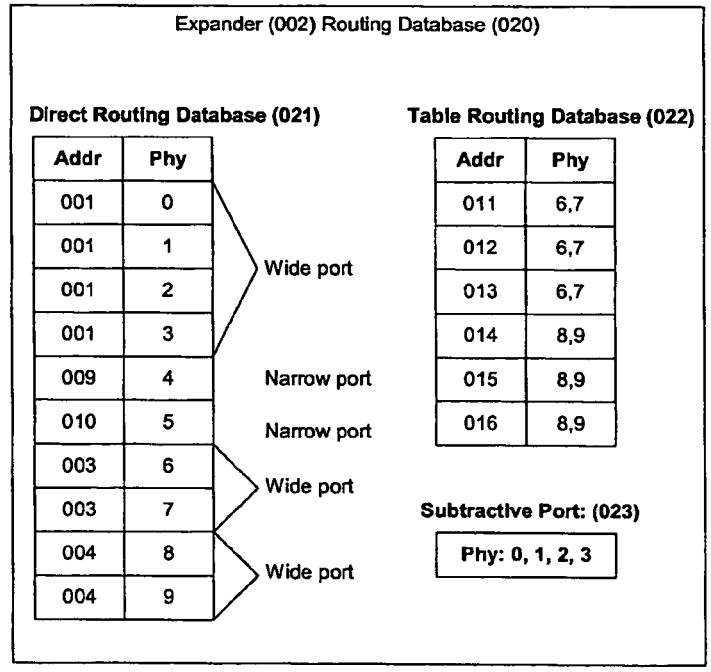
FIG. 1B illustrates an exemplary expander routing database.

The routing database (020) of expander (002) is illustrated in FIG. 1B. The database includes Direct routing database (021), table routing database (022) and subtractive routing port map (023). As noted earlier, the direct routing database (021) comprises the SAS address of the neighbouring devices directly attached to each phy. The direct routing database (021) provides a mapping table from SAS addresses to the Phy identifier. The phys mapped to a common SAS address are automatically considered as a wide port. The table routing database (022) contains the SAS addresses that are indirectly attached via down stream expanders. Note that in a SAS topology, the direction of subtractive routing ports is defined as upstream, and the opposite direction is defined as downstream. In this example topology, expander (003) and expander (004) are considered to be downstream to expander (002). Hence the table routing database (022) of expander (002) contains the devices attached to expander (003) and expander (004).

Three separate OPEN request examples (dotted line curves) are used to show the various types of SAS routing methods in expander (002). The first example shows the direct routing method. Device (005) initiates an OPEN request to (009). The OPEN request is routed through expander (001) Phy 4. Expander (002) receives the OPEN request from Phy 0 with destination address (009). Expander (002) then starts the routing process. In the first step, the expander (002) looks up the destination address (009) in the direct routing table (021). A match is found that maps address (009) to Phy 4. This indicates the destination (009) is directly attached to expander (002) Phy 4. Hence no further lookup is needed. The OPEN is routed to Phy 4 by expander (002) to device (009).

The second example illustrates the use of the table routing method. Device (006) initiates an OPEN to Device (013). The open is received by expander (002) from Phy 1. In the first step, expander (002) looks up the destination address (013) in the direct routing database (021). No match is found in the direct routing database (021) for address (013). Hence further lookup is needed. In the second step, the expander (002) looks up address (013) in the table routing database (022). The expander finds a match of address (013) that is mapped to phy 6,7. This indicates address (013) can be reached indirectly via the wide port consisting of Phy 6,7. Consequently the OPEN frame is routed to the wide port of Phy 6 and Phy 7.

The third example illustrates the use of the subtractive routing method. Device (010) initiates an OPEN to device (008). The expander (002) receives the OPEN address frame from Phy 5. In the first step, the expander (002) looks up the destination address (008) in the direct routing database (021) and finds no match. The expander (002) then proceeds to the second step, looks up the address in the table routing database (022), and again no match is found there. This indicates address (008) is either an unknown address, or can be reached via an upstream expander as defined by the subtractive port. Hence expander (002) uses a subtractive routing method to route this OPEN to the subtractive port (023) consisting of Phy 0, 1, 2 and 3.

As shown in the examples in FIGS. 1A & 1B, the direct/ table/subtractive routing methods provides an straightforward way of managing the topology information in SAS expanders that allows expanders to choose the right path to route OPEN address frames. However, when the expander phys are partitioned into logical zones, the prior art method does not provide mechanism to manage the zone membership information and to do routing accordingly.

To implement logical zoning, the following issues should preferably be addressed with regard to routing: Representation of zone information in direct routing database; Representation of zone information in the table routing database; Representation of zone information in subtractive routing port map; Direct routing methods that limit routing within zone boundary; Table routing methods that limit routing within zone boundary; subtractive routing methods that limit routing within zone boundary.

Embodiments of the present invention can address "device group access control". The purpose is to provide more sophisticated and flexible capability in SAS topology to control the access permission among the end devices. The "logical zoning" approach may be seen as assuming that all the devices within the same "logical zone" have unlimited access among each other. The "device group access control" approach allows access to a group of devices to be restricted to a list of acceptable groups. These access rights need not be symmetric, nor is any device required to have access rights to members of its own group Embodiments of the present invention introduce the concept of transparent logical zoning achieved with enhanced SAS expanders. Phy based logical zoning is provided according to an embodiment of the present invention, where expander Phys are assigned to at logical zones. For non-overlapping logical zoning, each Phy belongs and can only belong to one zone. In overlapping logical zoning, each expander Phy can be assigned to one or a plurality of logical zones. The physical SAS expander itself is partitioned into several "virtual expanders", each one consisting of the Phys assigned to its zone. All the remaining phys outside the logical zone are not visible to the "virtual expander". Each virtual expander implements the full functionality of a standard compliant SAS expander, so they could be used in any SAS domain as if they are physically separate expanders.

Figure 2A:
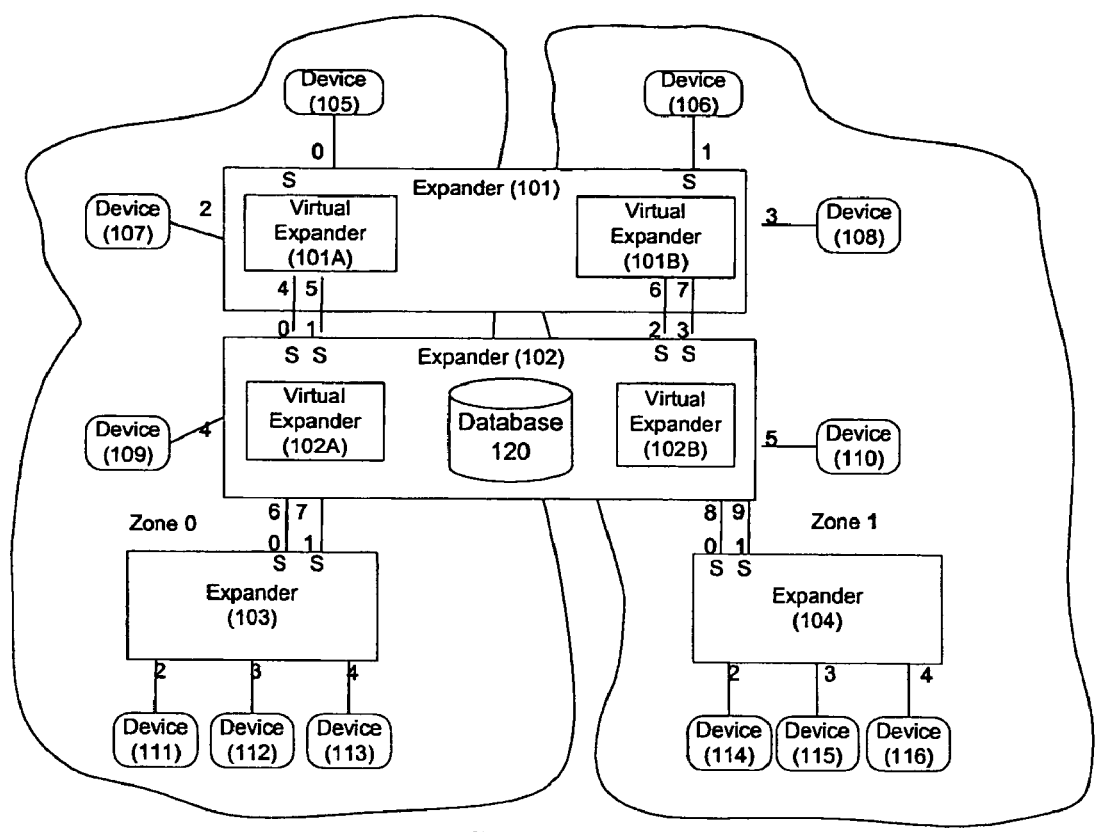
FIG. 2A illustrates routing in logical zones according to an embodiment of the present invention.

FIG. 2A shows an example of logical zoning according to an embodiment of the present invention. For convenience of illustration, assume the SAS address of the devices shown in this example has the value of the label of each device. In this example, there are four expanders (101, 102, 103 and 104) and twelve end devices (105~116). The physical topology is partitioned into two zones as indicated in FIG. 2k Zone 0 includes part of expander 101 (101A) and part of 102 (102A), the whole of expander 103, and end devices (105, 107, 109, 111, 112, 113). Zone 1 includes part of expander 101 (101B) and part of expander 102 (102B), the whole of expander 104, and end devices (106, 108, 110, 114, 115, 116).

Note that expander (101) is divided across two zones. A method according to an embodiment of the present invention allows expander 101 to behave like two isolated logical expanders (101A and 101B). Logical expander (101A) has its own SAS address 101A, and it includes Phy 0, 2, 4 and 5 as its expander Phys. Logical expander (101B) also has its own SAS address 101B. Logical expander (101B) includes Phy 1, 3, 6 and 7 as its expander Phys.

Similarly expander (102) is divided across two zones. The invention method allows expander 102 to behave like two isolated logical expanders (102A and 102B). Logical expander (102A) has its own SAS address 102A, and it includes Phy 0, 1, 4, 6, and 7 as its expander Phys. Logical expander (102B) has SAS address of 102B. It includes Phy 2, 3, 5, 8 and 9 as its expander Phys.

Logical expanders (101A, 101B, 102A, 102B) all contain logically isolated internal SMP targets that report and manage these Phys and the routing table resources associated with these specific Phys.

Furthermore, FIG. 2B illustrates the routing databases of expander (102) to support the topology in both zone 0 and zone 1. It should be noted that the routing database of two logically isolated expanders (102A) and (102B) share the physical routing data structures provided by physical expander 102. The entries in the data structure used by logical expander 102A are marked in the shaded portions. The entries used by logical expander 102B are provided in the white portions.

The Direct routing database (121) of expander 102 contains the SAS address of devices directly attached to physical expander 102. Note that Phys belonging to both zone 0 and zone 1 are contained in this table. This table provides a mapping between SAS address and the Phy ID. The drawing shows the Zone information associated with each entry of the table, which can be stored in the actual direct routing database, but need not be stored there, because the zone information can be derived from the Phy ID based on the zone membership configuration that is described in later part of this document. In this example, the Zone 0 entries include Virtual expander 101A, device 109, expander 103. And the Zone 1 entries include virtual expander 101B, device 110 and expander 104 as direct neighbours of expander 102.

The table routing database (122) of expander 102 contains the SAS address of devices indirectly attached to downstream expanders. Both entries for zone 0 and zone 1 are stored in the table routing database. Again, the zone information for each entry is shown for illustration purpose. Such information can be stored in the routing database entries, or can be derived based on Phy ID and zone membership configuration. In this example, Zone 0 table routing database entries include device 111, 112 and 113. The Zone 1 table routing database entries include device 114, 115 and 116.

Two subtractive port maps (123) are used according to this embodiment. Expander 102 provides per zone subtractive ports. For Zone 0, the subtractive port map includes Phy 0 and 1. For Zone 1, the subtractive port map includes Phy 2 and 3. That means OPEN frames with an unknown target address received by logical expander 102A are routed to subtractive port containing Phy 0 and 1. OPEN frames with an unknown target address received by logical expander 102B are routed to subtractive port contain Phy 2 and 3.

Figures 3A, 3B:
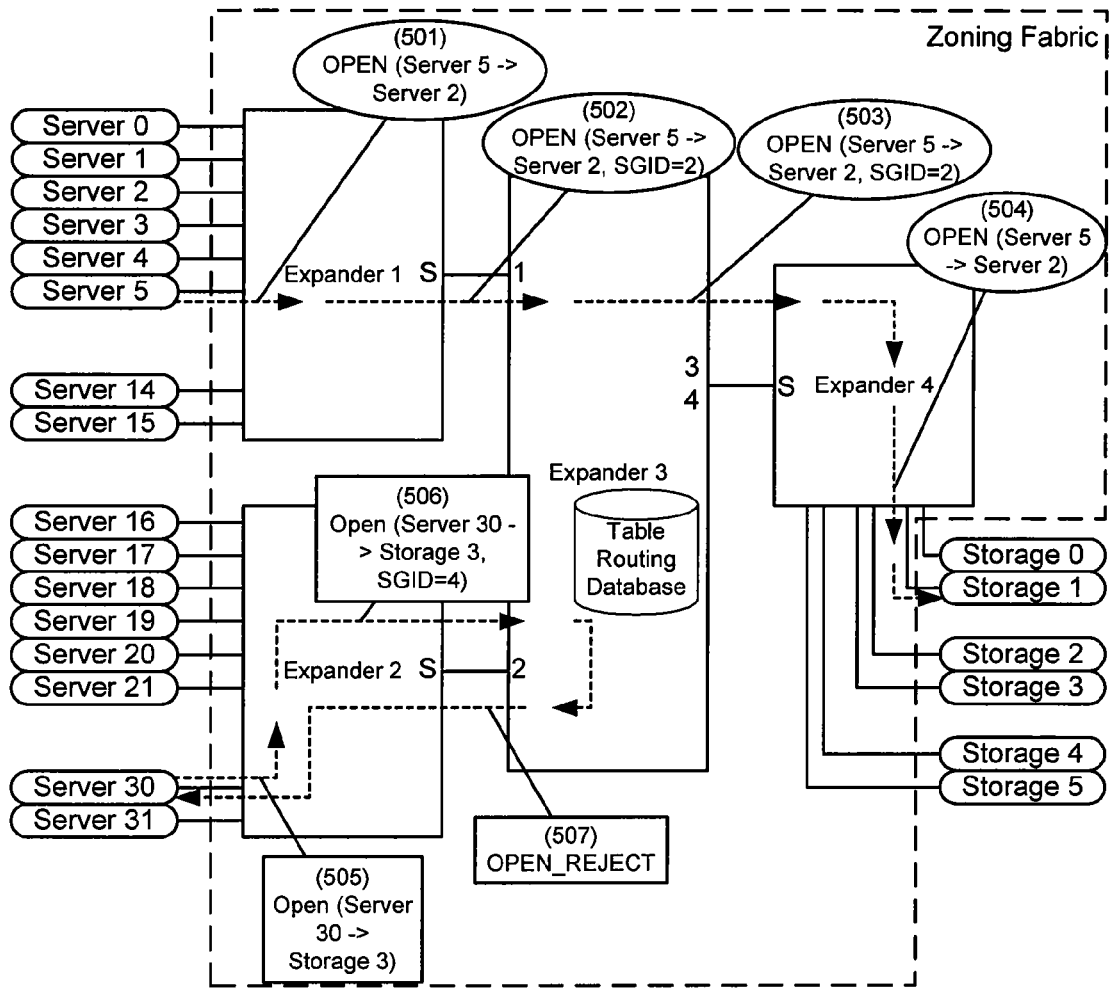
FIG. 3A illustrates routing in device groups of logical zones according to an embodiment of the present invention.
FIG. 3B illustrates a table routing database of an expander of FIG. 3A.
Figure 3C:
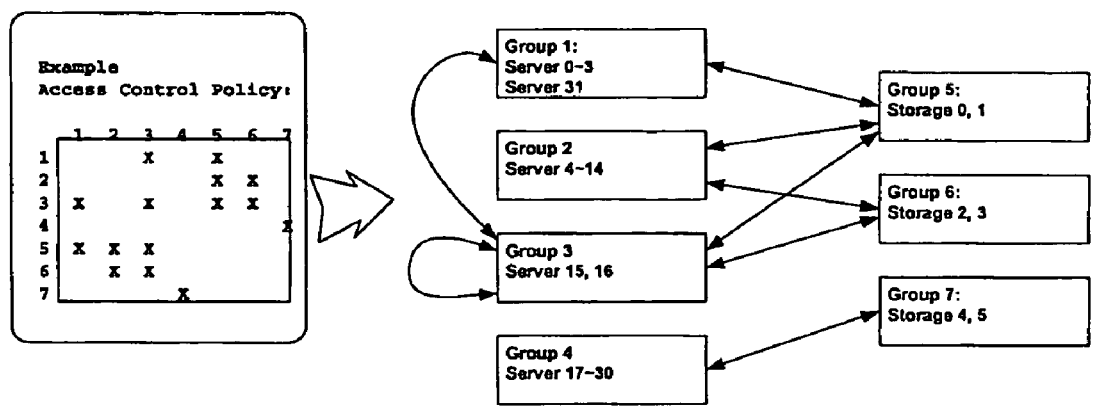
FIG. 3C illustrates the exemplary access control policy of an expander of FIG. 3A.

FIG. 3A shows an example of yet another method of routing with device group based access control according to an embodiment of the present invention. The zoning aware expanders (Expanders 1-4) form a SAS zoning fabric that implements access control function among devices attached to this fabric. The devices attached to the fabric are divided into Device groups with common access control privileges. There are 7 groups in this example. The group membership of each attached device is marked with the group ID labels in FIG. 3B. The access control policy matrix of FIG. 3C shows a set of example policies. FIG. 3c also includes a graphical view of the access policies with each node representing a group and each arc representing the access permission between two groups. For example, group 4 contains servers 17-30, and group 7 contains storage devices 4,5. An arc between them indicates there is a policy to allow any devices in group 4 to access any device in group 7 (but the devices in group 4 can not access each other, neither can the devices in group 7).

The dotted line arrows show two examples of OPEN handling among the device groups. (501) represents an OPEN from Server 5 trying to connect to Storage 2. (501) is received by Expander 1. Expander 1 inserts an SGID (Source Group ID) tag of 2 because the Phy connecting to Server 5 has Group ID=2. The Expander 1 does a routing lookup on Destination address of Storage 2, and resolves the routing via a "subtractive routing method" that finds the subtractive port towards Expander 3. Because the target Phy has Group ID=0 that can be connected to any Source Group, the policy check allows the OPEN to be routed. Hence the OPEN is forwarded to Expander 3. Since this Phy has Zflag=0, indicating the Phy is not at the boundary of the zoning fabric, the OPEN is transmitted by Expander 1 to Expander 3 with the proprietary tag SGID. Expander 3 now receives the OPEN (502) with SGID=2. Expander 3 again does a routing lookup based on destination address=Storage 2.

The Table routing method maps to Target Phy 3, which again has GID=0. Expander 3 Policy check allows the OPEN to go through. OPEN (503) is transmitted by Expander 3 to Expander 4 without tag stripping because Phy 3 is not on the zoning fabric edge (Zflag=0). When Expander 4 receives the OPEN (503), it does the routing lookup. The direct routing method maps the destination address to the target Phy connecting to Storage 2. In this case, the target Phy has GID=6; the Expander 4 does a policy check that shows P(SGID=2, DGID=6)=1 meaning the access control policy allows source group 2 to connect to group 6. Hence the routing goes through. Because the target is on the edge of the zoning fabric (Zflag=1), the OPEN (504) is sent to Storage 2 with the SGID tag stripped, such that OPEN (504) is in standard compliant format. Storage 2 receives the OPEN, and returns OPEN Accept. After that, the connection is established between Server 5 and Storage 2.

The second example shows an OPEN_REJECT based on access control policy check. The Server 30 (which is part of group 4) sends out an OPEN to Storage 3 (which is part of group 6) (505). The OPEN is received by Expander 2. The Expander 2 insert SGID tag of 4 based on the source PHY GID assignment. The Expander 2 looks up the address of Storage 3 and no match is found from either direct routing and table routing lookups. The subtractive routing resolves the destination address to the PHY 3 that connects to Expander 3. Since destination PHY 3 has GID of 0, the policy check allows the OPEN to go through. At step (506), the OPEN is transmitted by Expander 2 to Expander 3 with the SGID tag equal to 4. Expander 3 looks up the destination address of Storage 3 again. Table routing finds a match and maps Storage 3 address to PHY 4 with GID=6. The Expander 3 policy check shows that elements of SGID 4 are not allowed to form connections with elements of DGID 6. Hence Expander 3 generates OPEN_REJECT (507) that traverse back to Server 30 through Expander 2. One skilled in the art will appreciate that when data is transmitted across the boundary of the zone fabric (or outside of the logical zones of the previously described embodiment), any flags implemented to facilitate this invention can be removed by the expander at the edge, so that any messages leaving the logical domains are fully SAS-standard compliant.

Figure 4:
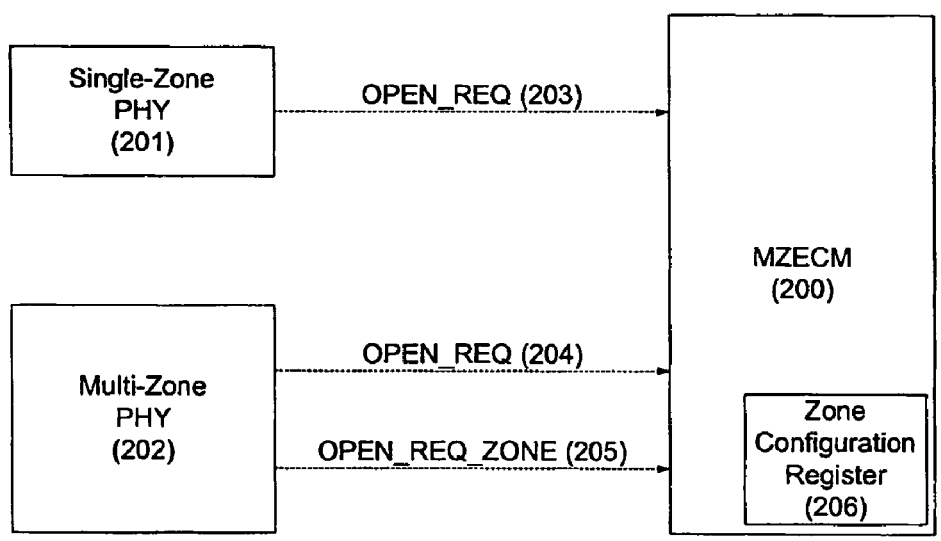
FIG. 4 illustrates multi-zone expander connection manager interface logical zones according to an embodiment of the present invention.

Embodiments of the present invention provide a multi-zone Expander Connection Manager (MZECM) that can support both non-overlapping logical zones, and logical zones that overlap. FIG. 4 shows an interface according to an embodiment of the present invention used for both types of Phys. In the first case, a single-zone expander Phy (201) (external or virtual Phy) can only belong to one zone. Therefore, the zone membership configuration for the single-zone Phy can be stored within the MZECM as a configuration parameter and need not be communicated across the ECM interface. So the interface between single-zone expander Phy (201) and the MZECM (200) only contains the OPEN_REQ (403) signal, although virtual domain information can be passed. The MZECM uses the internal Zone membership of the requesting Phy as the default OPEN_REQ_ZONE information in the absence of other information.

In the second case, a multi-zone Phy (202) can participate in multiple zones, so it is important for the ECMR requests to carry zone information: OPEN_REQ_ZONE (205) in addition to the open request OPEN_REQ. Even though a Phy can belong to multiple zones, each OPEN request made by the Phy should choose only one target zone that it belongs to. The OPEN_REQ_ZONE can be encoded as the zone index.

The exact encoding the OPEN_REQ and OPEN_REQ ZONE and how the signalling is done across the ECM interface are design details that do not affect the method according to embodiments of the present invention.

The MZECM should be aware of the zone membership of each Phy. Such information is part of the device configuration that is assigned by the user.

The configuration information can be represented by a two-dimensional vector: PHY_MEMBER [ZONE_ID] [PHY_ID].

$$PHY\_MEMBER[I][J] = 1 : \text{if } Phy\ J \text{ is part of Zone } I \qquad \text{Equation 1}$$

$$= 0 : \text{if } Phy\ J \text{ is not part of Zone } I$$

Embodiments of the present invention provide for the use of a per-zone subtractive port. The per-zone subtractive port can be represented by a bit vector called per zone subtractive port map.

per_zone_subtractive_port_map[i][j]=1: if the phy [j] should be part of the subtractive port for zone [i], otherwise 0.    Equation 2

The subtractive port for a zone should consist of Phys all belong to the specific zone. If per_zone_subtractive_port_map[i][j]=1, then the PHY_MEMBER[i][j] must be 1 also.

To save storage space, an embodiment of the present invention provides for the use of a global_subtractive_port_map vector.

global_subtractive_port_map[j]=1, if Phy[j] is part of the subtractive port for any zone.    Equation 3

Then the per_zone_subtractive_port_map can be easily calculated from the global_subtractive_port_map and the PHY_MEMBER[ ][ ]:

per_zone_subtractive_phy_map[i][j]=PHY_MEMBER[i][j] && global_subtractive_port_map[j].    Equation 4

The MZECM can handle open requests according to the following criteria:

1. If the OPEN request presented to the MZECM does not carry requested zone information, the source Phy is used to determine the requested zone. In this case, the requested zone is the Zone ID that is assigned to the source Phy.

2. Direct lookup is performed based on direct routing database first. Only Phys belonging to the requested Zone are selected as the target phy map.

3. If the direct lookup fails to find a match, or the matched address does not map to any phy that is part of the requested zone, then perform table lookup. The table lookup should only find the entries that match the target address and the Phy ID belonging to the requested target zone. Only the phys belonging to the requested zone are selected as the target phy map 4. If table lookup fails to find a match, or if the matched address does not map to any phy that is part of the requested zone, then perform subtractive routing. The subtractive routing selects the per zone subtractive routing port as the target phy map.

5. If the first 4 steps fail to find a target phy map that contains phys belonging to the requested target zone, then declare routing lookup failure and generate OPEN_REJECT.

Figure 5:
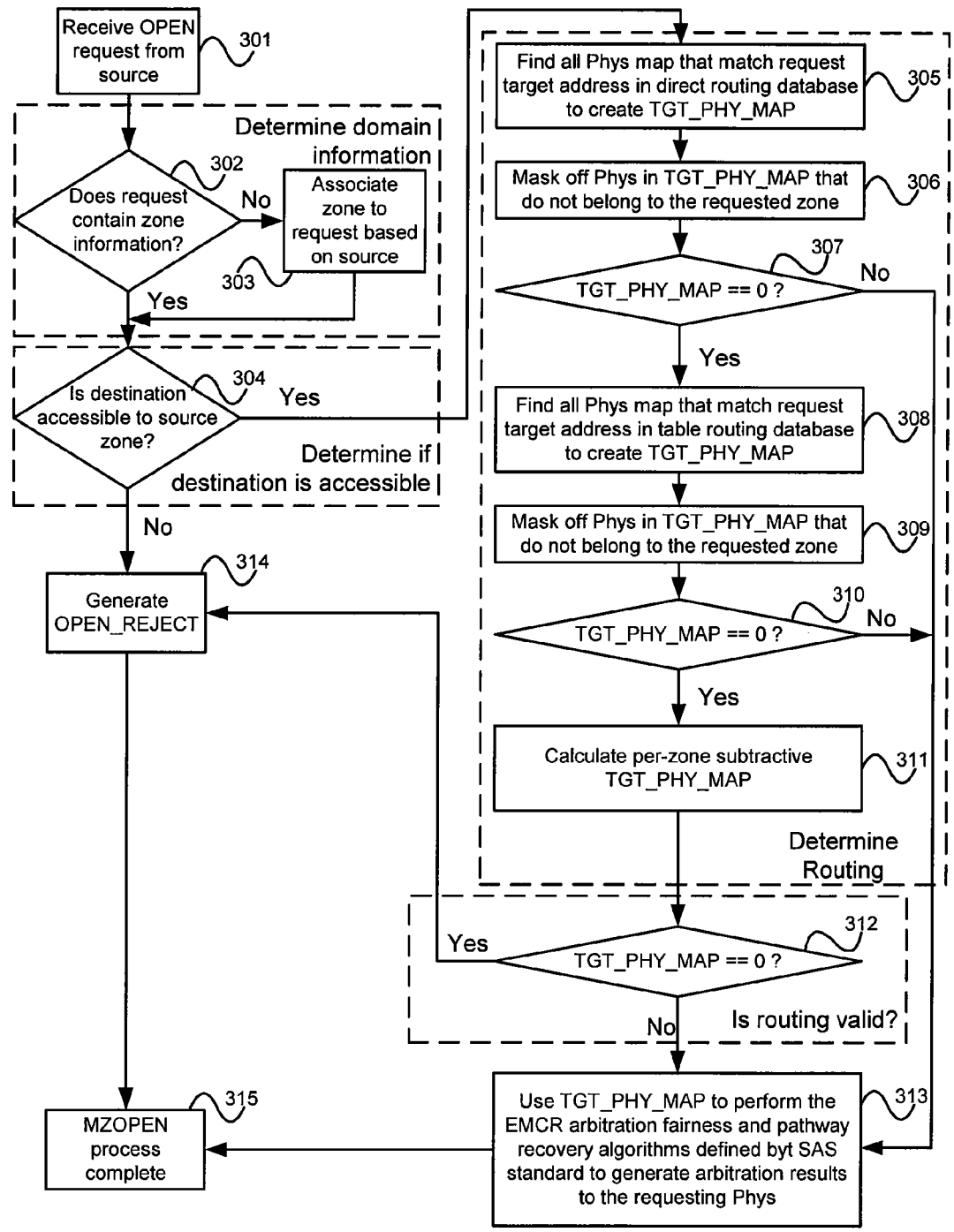
FIG. 5 is a flowchart illustrating a method according to an embodiment of the present invention.

FIG. 5 details MZECM routing processing steps according to an embodiment of the present invention when handling an OPEN request. The routing procedure is an important part of the ECM arbitration algorithm as specified by SAS standard. The purpose of the routing procedure is to search the target SAS address in the direct/table/subtractive routing databases to determine whether the address is routable (can be associated with any expander Phy), and if yes produce a target phy map that represents all the expander Phys that can be used to route the OPEN frame to the destination.

The process starts at step (301) in which one or more OPEN_REQ requests are received from a source Phy (SPHY). Such a request contains a target address that is of interest to the ECMR routing procedure and optionally the OPEN_REQ_ZONE information. The next step is to determine domain information. Step (302) checks if the request contains zone information, if yes the process continues to step (304); otherwise step (303) is taken. In Step (303), for an OPEN request without target zone information (from a single-zone Phy), the default zone information that is the same as the zone membership of the source Phy is used as the request zone. This step finds the Zone ID of the source Phy based on the PHY_MEMBER configuration information and assigns it to OPEN_REQ_ZONE as the default target zone. At step (304), the MZECM checks if source Phy a member of the OPEN_REQ_ZONE. This checking step prevents a SPHY from routing OPEN requests to zones of which it is not a member. If the check fails, step (314) is taken to reject the OPEN. Otherwise, MZECM proceeds to determine routing information starting with Step (305).

Step (305) performs the address lookup in the direct routing table. Note that various methods could be used to perform the lookup in direct routing table including well-known methods such as CAM (Content addressable memory), hash lookup procedure and linear search. The exact choice of lookup method does not affect the general applicability of embodiments of the present invention. The direct address loop procedure produces a vector (TGT_PHY_MAP) that represents all Phys that match the target address. If no match is found, the TGT_PHY_MAP is set to all zero. Step (306) mask off all the Phys that do not belong to the OPEN_REQ_ZONE from TGT_PHY_MAP. Step (307) checks if the TGT_PHY_MAP is all zero; if so, further processing needs to be done by taking step (308). If TGT_PHY_MAP is not all zero, that means the direct routing has been successful in finding TGT_PHY_MAP, hence step 313 is taken.

Step (308) performs the table routing lookup procedure by searching the target address in the table routing database. Again, various lookup methods can be used, but the choice of lookup method does not affect general applicability of embodiments of the present invention. The table routing lookup produces a TGT_PHY_MAP vector that represents all the Phys that matches the target address. At step (309), all Phys that are not a member of the OPEN_REQ ZONE are masked off from the TGT_PHY_MAP. Step (310) checks if the table routing method has produced usable target Phy. If TGT_PHY_MAP equals to all zero, that means the table lookup method has failed to find suitable target Phys, hence step (311) is taken. Otherwise, step (313) is taken.

Step (311) performs subtractive routing method by calculating the subtractive routing port map based on the Phy_Member and Global_subtractive_Port_map (using. Equation 4). Note that embodiments of the present invention also support the alternative method of using per-port subtractive routing port as defined by Equation 2. In either approach, the subtractive port map for OPEN_REQ_ZONE is assigned to TGT_PHY_MAP. Step (312) checks if subtractive routing method has found any target Phy based on the target address. If not, Step (314) is taken to generate OPEN_REJECT to indicate none of the three routing methods resolved the OPEN request, hence the OPEN request should be rejected.

If a match is found by any of the routing methods described above then step (313) is taken. Step (313) performs further arbitration steps based on the TGT_PHY_MAP information generated by the MZECM routing engine. The details of the arbitration steps can be performed according to approaches known to those of ordinary skill in the art. Step (315) completes the MZECM routing and arbitration procedure after OPEN_REJECT or other arbitration results are generated from step (314) or (313).

For a SAS fabric that supports up to N device groups, an expander in such a fabric with M phys should preferably have the following configuration information:

1. GID[M] —Each Phy would be assigned a group ID in the range of 0 . . . N−1.

2. Zflag[M] —Each Phy would be associated a fabric boundary flag. 1 indicates the Phy is at the edge of the fabric, and 0 indicates the Phy is an inter-expander link that is inside the zoning fabric.

3. P[N][N] —Access control policy matrix that defines whether a source group is allowed to access a destination group. P[x][y]=1 indicates any device in group x is allowed to communicate with any device in group y. P[x][y]=0 indicates any device in group x is not allowed to communicate with any device in group y.

The Device Group BPP preferably can handle an ECM routing request based on the following criteria:

1. The ingress expander PHY at the fabric boundary (with ZFLAG of the PHY assigned to 1) inserts a proprietary SGID tag into the OPEN before presenting the OPEN request to the ECM for routing.

2. The expander ECM does direct, table, and subtractive routing lookup in the way specified by SAS standard except that the routing lookup result will provide not only the destination PHY that the destination address is mapped to, but also the GID that is associated with the destination address. This could preferably be implemented by having the table routing database contain an additional GID field in each entry. After the routing methods provide the routing result, the ECM checks the access control policy between the Source GID and destination GID. If P[SGID][DGID]=1, the ECM will proceed with the arbitration process as specified by SAS standard, otherwise, the ECM will generate OPEN_REJECT indication to the requesting PHY.

3. IF the destination PHY is not at the zoning fabric boundary (Zflag=0), the OPEN is transmitted with the SGID tag. Otherwise, the egress expander PHY (with Zflag=1) removes the SGID such than a SAS standard compliant OPEN is transmitted by the expander.

Figure 6:
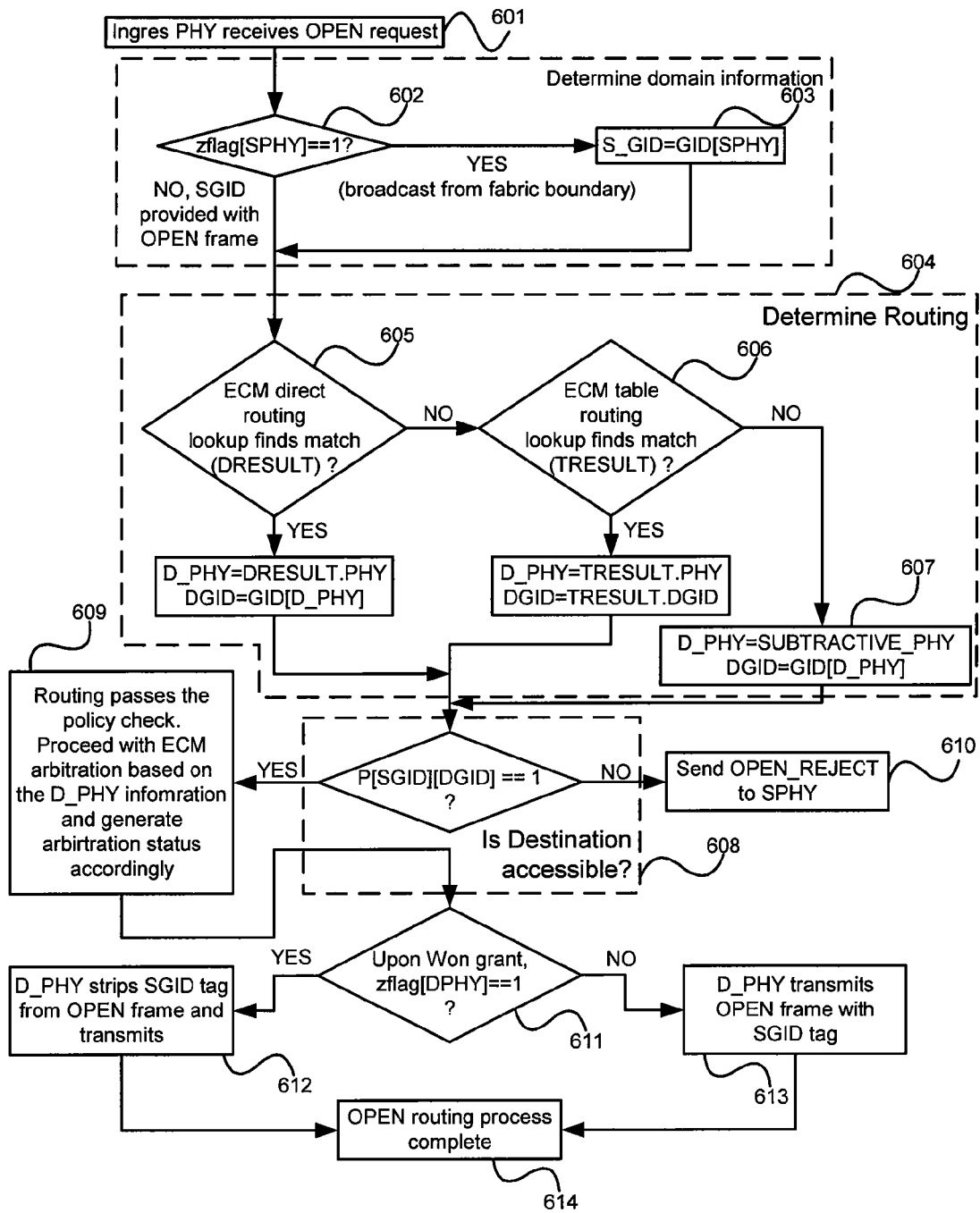
FIG. 6 is a flowchart illustrating another method according to an embodiment of the present invention.

An algorithm according to an embodiment of the present invention that performs routing processing based on the criteria above is illustrated in the flow chart of FIG. 6. In step (601) an open request is received over an ingress PHY. The next step is to determine the domain information, which in this example is group related. In step (602) the OPEN is examined to determine if it has already has group information. If no group information is present, the OPEN came from the boundary of the zoning fabric and is assigned a default value in step (603). Following a positive determination in (602) or following (603) routing information is determined. In (605) an attempt at direct routing is made. If that is unsuccessful, an attempt at table routing is made in (606). Following a successful attempt at routing in either (605) or (606) an egress PHY is selected. If 606 was unsuccessful, the subtractive routing PHY is selected in (607). In (608), the availability of the selected PHY to members of the source group is determined. This will determine whether or not the requesting group can access the destination. If the group has access, the method proceeds to step (609) where normal ECM arbitration is pursued. Upon completion of (609), a determination of whether the request is leaving the zoning fabric is made in (611). If the selected PHY accesses the outside of the zone, the tags used to identify the group is stripped in step (612) and the OPEN routing process is completed in (614). If the PHY connects to a device in the zone fabric, the OPEN request is left intact in (613) and the OPEN routing process is completed in (614). If, in (608), it is determined that the destination node is not accessible to members of the source group, an OPEN_REJECT is issued to the source node in (610) and the OPEN routing process is completed in (614).

Embodiments of the present invention can be implemented in Application Specific Standard Integrated Circuit Products.

The MZECM function can be implemented in a functional block (TSB) called ECMR_LT, which incorporates the functionality of Expander Connection Manager (ECM), Expander Connection Router (ECR) and Broadcast Primitive Processor (BPP). The MZECM function described by embodiments of the present invention is in the BPP_SM sub-block of ECMR_LT shown in FIG. 7.

In some implementations, the MZECM method can be implemented in logic gates using ASIC technology. But it should be noted that the same algorithm could be implemented using other means of realization such as using a combination of software and hardware. One possible implementation utilizes programmable logic devices such FPGA to implement the MZECM logic. Other ways of realization include the use of software/firmware running on a microprocessor or a programmable engine to realize the processing flow described by embodiments of the present invention.

In summary, an aspect of the present invention provides a method for assigning logical zones, and limiting routing traffic within the logical zone boundary in a SAS communications networks. The method can include the steps of: receiving an OPEN request; and performing direct/table/subtractive routing methods based on logical zone assignment. The method can support non-overlapping logical zones or non-overlapping logical zones. Zone membership can be assigned based on Phy (as defined in Equation 1). In one embodiment, each internal or external Phy can belong to one logical zone only. In another embodiment, each internal or external Phy can belong to multiple logical zones. In a further embodiment, the expander can support a mixture of single-zone Phys and multiple-zone Phys. Subtractive ports can be assigned for each port. In one embodiment, a subtractive port map is assigned to each logical zone (Equation 2). In a separate embodiment, a global subtractive port map vector is assigned according to Equation 3, and the per zone subtractive port map is calculated according to Equation 4.

The method can support broadcast requests that carry request zone information explicitly or implicitly. In one embodiment, each request carries explicit information that indicates the target zone for the OPEN request. In a separate embodiment, the request does not carry explicit target zone information, but the target zone information is derived from the source Phy and the zone membership configuration.

Methods are provided according to aspects of the present invention, as shown in FIG. 5. The following aspects can be included: a direct routing step with zone membership masking; a table routing step with zone membership masking; and a subtractive routing step that use per-zone subtractive port map. Such methods can be realized in an apparatus as shown in FIG. 4, including the block of MZECM and Zone Configuration Register. Such an apparatus can also include ECM request and interfaces as shown in FIG. 4.

Methods according to embodiments of the present invention can support device group based access control policies. Group membership can be assigned based on Phy. Each PHY can be assigned to one unique GID to identify the device group it belongs to. ZFLAG can be assigned to each PHY to identify the zoning fabric boundary. An access control policy can be assigned by the P[N][N] matrix as described earlier, namely: if P[SGID][DGID]=1, routing is allowed between the devices in group SGID and devices in group DGID; and if P[SGID][DGID]=0, routing is prohibited between the devices in group SGID and devices in group DGID.

There are three known methods of serial SCSI routing: direct routing; table routing; and subtractive routing. In direct routing, an end device always looks first in a table of devices to which it is directly attached in order to determine routing.

In table routing, if an address is indirectly attached to a particular device, those addresses show up in a table routing table, with the table in the table routing approach being larger than the table in the direct routing approach. Indirect routing refers to an instance where an intended recipient expander is not directly connected to a source expander but is connected to an intermediate expander which itself is directly connected to the source expander. If no match is found in a direct or table routing approach, a subtractive routing approach can be used. Similar to the example of an IP subnet in which there is a default gateway, if you have a tree configuration, most likely one port on each expander will be defined as a subtractive port. When a request is received for which the address is unknown, the requesting device issues an open request, such open x to y, where x represents the requesting device and y represents the intended destination device. This open request is sent up the hierarchy over the subtractive route to the next level, where the device has more knowledge about other network devices and topologies. If necessary, the open request is sent all the way up the tree to the top of the sub-tree, or to the fan-out expander. The fan-out expander, having knowledge about every device in the sub-tree, sends the open request to the appropriate location so that the address of y is found and returned to the sending device. This is how routing is achieved in a tree topology.

In a multi-zone topology, each PHY of a physical expander is assigned to a particular zone. The physical expander is logically partitioned into different zones. Each logical expander is treated as a complete and separate physical expander. One characteristic of an expander is that it needs to have a default route. A result of separating the physical expander into two or more logical expanders is that each logical expander now needs to have a default route. This can also be described as having a per-zone subtractive port.

Therefore, if an open request already includes zone information, this zone information is used. Otherwise, the requested zone is assumed from the zone ID of the requesting PHY. Direct lookup is performed first based on a direct routing database. Only PHYS belonging to the requested zone are selected as part of the target PHY map. Therefore, even if another PHY matches the same address, it has no significance if it is part of the same zone. Only PHYS belonging to the same zone are visible. If the direct lookup fails to find a match, or the matched address does not map to any PHY that is part of the requested zone, then a table lookup is performed. The table lookup should only find entries that match the target address and for which the PHY ID belongs to the requested target zone. Therefore, even the table is subjected to the zone restriction, i.e. only the PHYS belonging to the requested zone are selected to be part of the target PHY map.

If the table lookup fails to find a match, or if the matched address does not map to any PHY that is part of the requested zone, then subtractive routing is performed. The subtractive routing selects the per-zone subtractive routing port as the target PHY map. If all of these steps fail to find a target PHY map that contains PHYS belonging to the requested target zone, then a routing lookup failure is declared and an OPEN_REJECT message.

As compared with known approaches, the approach of the present invention not only uses physical addresses but also uses logical zone information to perform routing. Zone information is also used in order to select the default route.

There is a similar principle used with respect to routing in virtual local area networks (VLAN). In VLAN, the VLAN tag is used in a similar manner as the group ID information in the SAS implementation of the present invention. One difference, however, is that in Ethernet there is no concept of direct routing, since Ethernet always uses table routing. Also, there is no concept of subtractive routing in Ethernet. In Ethernet, you either find a match or do not find a match, and in the case of not finding a match, a broadcast message is sent to every device in the VLAN. In the present invention, the subtractive concept of SAS is expanded to a per-zone implementation. When comparing SAS subtractive routing with an IP default gateway in Ethernet, a subnet match or longest prefix match is typically used to define subnets in an Ethernet implementation. Therefore, the subnet boundary is always defined based on address limitations, or limitations of addressing, such as how many bottom bits are allowed to change. In the SAS implementation of the present invention, the address is totally arbitrary and may be any legal 64-bit SAS address. A primary difference in the present invention is that zone information is used in conjunction with a physical address to perform zone routing.

The present invention can also be applied to group based access control and routing. In this case, an ingress PHY at a fabric boundary inserts a group ID into the open request before the open request is presented to the ESM before routing. As such, the frame format is a modified version of the standard frame. The expander ESM does direct, table, and subtractive routing lookup in the way specified by the SAS standard except that the routing lookup result will provide not only the destination PHY that the destination address is mapped to, but also the group ID that is associated with the destination address. After the routing method provides the routing result, the ESM performs a policy check to ensure correlation between the source group ID and destination group ID. If the destination address is not at a fabric or group boundary, the group ID will be retained as the OPEN is forwarded. However, if the destination PHY is at the zoning fabric boundary, the egress expander PHY removes the source group ID so that an SAS standard compliant open message is transmitted by the expander. Again, this is similar to the use of VLAN tags in areas that are VLAN aware, since this VLAN tag is stripped at a zone boundary. This can be described in relation to FIG. 3, which shows devices that are zoning aware, and other devices that are at the edge of the zoning fabric. For example, the open coming in from server 5 is a regular open without zone information. At the zone boundary, the expander 1 inserts the source group ID into the open message. Expander 1 does the routing and finds the way to expander 3. Because expander 3 is still within the zoning aware fabric boundary, this open is propagated with the group ID so that expander 3 can perform further processing. The open message travels hop by hop. Once it arrives at expander 4, expander 4 decides to route the message to storage device number 2. Since this open message will be sent across the zoning away fabric boundary to a device that does not understand zoning, the egress PHY of expander 4 strips off the group ID tag. The message is therefore sent to the destination device in a format that it can understand.

In another example, server 30 is trying to talk to storage device number 3, which the server has no permission to do. An open is sent to expander 2, which does not have explicit knowledge of the destination. As such, the open request is subtractively routed to expander 3. Expander 3 now knows the destination of storage 3 and knows that it belongs to group 6 based on a table lookup. The expander compares the source group to the destination group and finds that source group 4 and destination group 6 do not match; therefore there is no proper permission for this request. As such, the open request is rejected and the reject message is sent back to server 30.

In summary, the present invention extends the SAS routing method in order to handle group information and a policy check and generate a reject message when needed.

Figure 7:
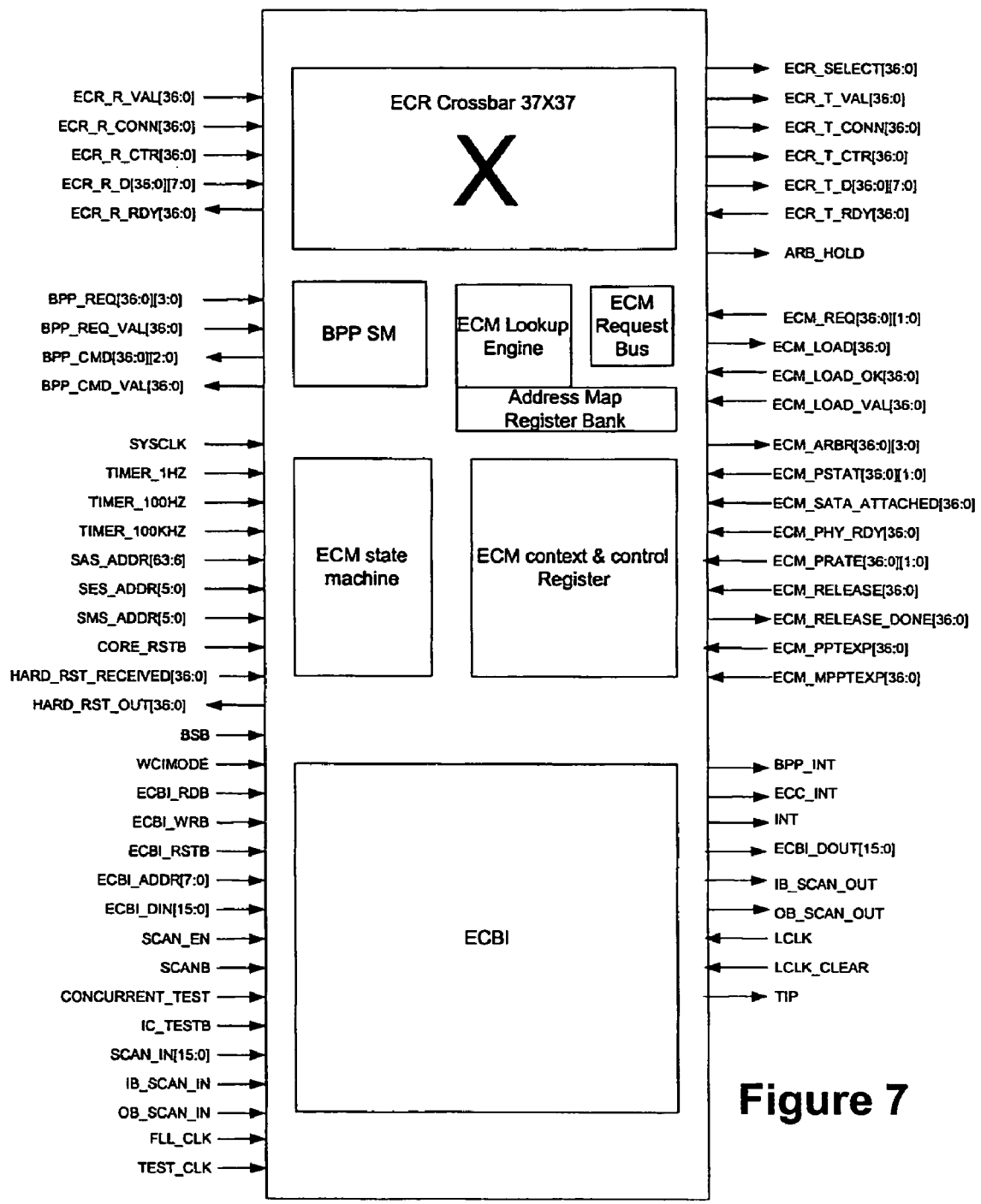
FIG. 7 is a block diagram illustrating a multi-zone expander connection manager according to an embodiment of the present invention.

With respect to FIG. 7, the routing is handled in the ESM state machine and in the ESM lookup engine. Therefore, that region is where the algorithm for zone based routing functions is implemented. The address map register bank is also used in this process.

The present invention can be distinguished partly based on the policy based route table routing. This is in addition to the zone based routing implementation. Known systems such as Ethernet, fiber channel, and IP all define a boundary in an implicit way based on zone or group assignment. The present invention provides an explicit policy based routing, which can be applied broadly in many different applications.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of handling connection requests in a serially attached SCSI (SAS) expander comprising:
    receiving a connection request from a source node connected to the expander, the request addressed to a destination node, the source and destination nodes being nodes in a SAS topology logically divided into a plurality of virtual domains, each node in the SAS topology being associated with at least one of the plurality of virtual domains, and nodes associated with one of the plurality of virtual domains being inaccessible to nodes solely associated with others of the plurality of virtual domains;
    determining a virtual domain associated with the source node;
    determining that the destination node is associated only to virtual domains other than the virtual domain associated with the source node and is inaccessible; and
    transmitting a connection rejection to the source node, wherein the step of determining a virtual domain associated with the source node includes assigning a zone identifier to the connection request when the zone identifier is not present in the connection request, and
    wherein the step of assigning a zone identifier includes selecting a zone identifier in accordance with a SAS phy over which the connection request is received.

2. The method of claim 1 wherein the connection request is received over a first SAS phy.

3. The method of claim 1 wherein the step of determining a virtual domain associated with the source node includes examining the connection request to determine a zone identifier uniquely associated with the virtual domain associated with the source node.

4. The method of claim 1 wherein the step of determining that the destination node in inaccessible includes:
    determining an egress port associated with the destination node; and
    determining that the egress port associated with the destination node is inaccessible for nodes in the virtual domain associated with the source node.

5. The method of claim 4 wherein the step of determining that the egress port is inaccessible includes examining an access policy matrix.

6. The method of claim 1 wherein the virtual domain is a logical zone, and wherein the step of determining that the destination node is inaccessible includes determining that the destination node is not part of the logical zone associated with the source node.

7. A Serially Attached SCSI (SAS) expander for implementing virtual domains comprising:
    a first logical expander, associated with a first virtual domain comprising a first plurality of SAS devices within a SAS topology, the first logical expander having associated therewith a first plurality of logical connections connecting each of the first plurality of SAS devices to the first logical expander, the first logical expander being responsive only to messages received from SAS devices connected to the first plurality of logical connections and routing the received messages only to SAS devices connected to the first plurality of logical connections;
    a second logical expander, associated with a second virtual domain comprising a second plurality of SAS devices within the SAS topology, the second logical expander having associated therewith a second plurality of logical connections connecting each of the second plurality of SAS devices to the second logical expander, the second logical expander being responsive only to messages received from SAS devices connected to the second plurality of logical connections and routing the received messages only to SAS devices connected to the second plurality of logical connections;
    at least one routing database for accessing direct routing, table routing and subtractive routing information associated with each of the first and second logical expanders; and
    a routing engine for receiving a connection request from a device connected to at least one of the plurality of phys, the connection request addressed to a destination device, for routing the received request to a device connected to a phy selected from the plurality of phys in accordance with a mapping obtained from the routing database and in accordance with the access control policy stored in the routing database, and transmitting a connection rejection message to a source of a received connection request when the phy associated with the destination device is specified as inaccessible to the source of the request in the access control policy,
    wherein the routing engine includes means to determine a group associated with the source of the connection request by examining a header field of the connection request, and
    wherein the routing engine further includes means to assign a group to a connection request upon failure of the means to determine a group to identify a group by inspecting the header field, for modifying the header field of the connection request to identify a group determined in accordance with the one of the plurality of phys that the connection request was received over.

8. The expander of claim 7 wherein the first and second plurality of logical connections are overlapping sets.

9. The expander of claim 7 wherein the first and second plurality of logical connections are non-overlapping sets.

10. The expander of claim 7 wherein each logical connection in the first and second plurality of logical connections corresponds to at least one phy.

11. The expander of claim 7 wherein the routing database includes routing information for devices indirectly connected to the expander through one of the first plurality of logical connections.

12. A Serially Attached SCSI (SAS) expander for providing virtual domains comprising:

a plurality of phys, each of the plurality of phys connecting the SAS expander to one of a plurality of SAS devices;

a routing database for mapping a device address to at least one of the plurality of phys, and for storing an access control policy defining a plurality of virtual domains, each of the plurality of phys being associated to at least one of the plurality of virtual domains; and a routing engine for receiving a connection request from a device connected to at least one of the plurality of phys, the connection request addressed to a destination device, for routing the received request to a device connected to a phy selected from the plurality of phys in accordance with a mapping obtained from the routing database and in accordance with the access control policy stored in the routing database, and transmitting a connection rejection message to a source of a received connection request when the phy associated with the destination device is specified as inaccessible to the source of the request in the access control policy, wherein the routing engine includes means to determine a group associated with the source of the connection request by examining a header field of the connection request, and wherein the routing engine further includes means to assign a group to a connection request upon failure of the means to determine a group to identify a group by inspecting the header field, for modifying the header field of the connection request to identify a group determined in accordance with the one of the plurality of phys that the connection request was received over.

13. The expander of claim 12 wherein the routing engine further includes means for removing group association from a connection request when the destination phy connects the expander to an external expander that does not recognize virtual domains.

14. The expander of claim 12 wherein the routing database includes an access control matrix for storing for the access control policy.

15. The expander of claim 12 wherein the access control policy specifies at least one group that a connection request can be directed to in accordance with a group associated with the source of the connection request.

* * * * *

UNITED STATES PATENT AND TRADEMARK OFFICE
CERTIFICATE OF CORRECTION

PATENT NO. : 7,668,925 B1  Page 1 of 1
APPLICATION NO. : 11/341573
DATED : February 23, 2010
INVENTOR(S) : Liao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1061 days.

Signed and Sealed this

Fourth Day of January, 2011

David J. Kappos
*Director of the United States Patent and Trademark Office*